United States Patent
Li et al.

(10) Patent No.: US 10,338,236 B2
(45) Date of Patent: Jul. 2, 2019

(54) RADIATION DETECTION APPARATUS AND METHOD, DATA PROCESSING METHOD AND PROCESSOR

(71) Applicants: NUCTECH COMPANY LIMITED, Beijing (CN); TSINGHUA UNIVERSITY, Beijing (CN)

(72) Inventors: Yuanjing Li, Beijing (CN); Ziran Zhao, Beijing (CN); Jianmin Li, Beijing (CN); Yulan Li, Beijing (CN); Weibin Zhu, Beijing (CN); Xiang Zou, Beijing (CN); Qingjun Zhang, Beijing (CN); Chunguang Zong, Beijing (CN); Xiaolin Zhao, Beijing (CN); Shuwei Li, Beijing (CN); Junxiao Wang, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/719,571

(22) Filed: Sep. 29, 2017

(65) Prior Publication Data
US 2018/0164449 A1 Jun. 14, 2018

(30) Foreign Application Priority Data

Dec. 8, 2016 (CN) .......................... 2016 1 1143083

(51) Int. Cl.
*G01T 1/24* (2006.01)
*G01T 1/17* (2006.01)

(52) U.S. Cl.
CPC .............. *G01T 1/248* (2013.01); *G01T 1/17* (2013.01)

(58) Field of Classification Search
CPC ........................................................ G01T 1/248
See application file for complete search history.

(56) References Cited

U.S. PATENT DOCUMENTS

| 2012/0032085 A1* | 2/2012 | Baeumer | G01T 1/1647 250/362 |
| 2016/0095559 A1* | 4/2016 | Gagnon | A61B 6/4241 600/425 |

(Continued)

FOREIGN PATENT DOCUMENTS

| CN | 101576514 A | 11/2009 |
| CN | 101903799 A | 12/2010 |

(Continued)

*Primary Examiner* — Yara B Green
(74) *Attorney, Agent, or Firm* — Kilpatrick Townsend & Stockton LLP

(57) ABSTRACT

This disclosure provides a radiation detection apparatus and a method, a data processing method and a processor, which relates to the field of radiation detection technology. Wherein, the radiation detection apparatus of this disclosure comprises: a radiation detector which generates an electrical signal by interacting with X-rays; an Analog-to-Digital Converter (ADC) which is coupled to the radiation detector and transmits the electrical signal to a waveform data; and a data processor which receives the waveform data from the ADC, determines the number of single photon signals according to the waveform data, and determines whether an integral signal and/or a count signal of the waveform data will be used for imaging according to the number of the single photon signals.

14 Claims, 5 Drawing Sheets

(56) References Cited

U.S. PATENT DOCUMENTS

2016/0313457 A1* 10/2016 Abraham ................ G01T 1/247
2017/0123077 A1* 5/2017 Bendahan ............. G01T 1/2018

FOREIGN PATENT DOCUMENTS

| CN | 102793554 A | 11/2012 |
| CN | 104165639 A | 11/2014 |
| CN | 106596597 A | 4/2017 |
| JP | 61226675 A | 10/1986 |

* cited by examiner

RADIATION DETECTION APPARATUS AND METHOD, DATA PROCESSING METHOD AND PROCESSOR

CROSS-REFERENCES TO RELATED APPLICATIONS

The present application claims the priority to Chinese Patent Application No. 201611143083.5, titled "RADIATION DETECTION APPARATUS AND METHOD, DATA PROCESSING METHOD AND PROCESSOR", filed on Dec. 8, 2016 with the State Intellectual Property Office of the PRC, which is incorporated herein by reference in its entirety.

FIELD OF THE DISCLOSURE

This disclosure relates to the field of radiation detection technology, particularly to a radiation detection apparatus and a method, a data processing method and a processor.

BACKGROUND OF THE INVENTION

In applications of radiation detection and imaging systems, it is often needed to detect items in different sizes or in significantly different substances. If the object to be detected has a large mass thickness, a large amount of scattered X-rays will be received by a detector, the strength of scattered X-rays may be even greater than the strength of transmitted signals, and as a result, serious interference may occur and may impact the substance discrimination capability of the radiation detection and imaging system.

In the prior art, in order to guarantee the detection effect, it is often necessary to increase the energy of the incident rays or increase the X-ray dose.

BRIEF SUMMARY OF THE INVENTION

An object of this disclosure is to provide a radiation detection solution for improving detection and recognition capability.

According to an aspect of this disclosure, a radiation detection apparatus is provided, comprising: a radiation detector which generates an electrical signal by interacting with X-rays; an Analog-to-Digital Converter (ADC) which is coupled to the radiation detector and transmits the electrical signal to a waveform data; and a data processor which receives the waveform data from the ADC, determines the number of single photon signals according to the waveform data, and determines whether an integral signal and/or a count signal of the waveform data will be used for imaging according to the number of the single photon signals.

Optionally, the data processor is further configured to determine whether an integral signal and/or a count signal of the waveform data will be used for imaging according to the number of the single photon signals by: comparing the number of the single photon signals with a predetermined lower threshold and a predetermined upper threshold; using the integral signal of the waveform data as an imaging signal to perform imaging if the number of the single photon signals is less than the predetermined lower threshold; using the count signal of the waveform data as an imaging signal to perform imaging if the number of the single photon signals is greater than the predetermined upper threshold; and using a weighted value of the count signal and the integral signal as an imaging signal to perform imaging if the number of the single photon signals is between the predetermined lower threshold and the predetermined upper threshold.

Optionally, the data processor is further configured to determine the number of the single photon signals by acquiring single photon signal recognition parameters according to the waveform data, wherein the single photon signal recognition parameters include speak amplitude, the number of peaks and/or integral area size.

Optionally, the data processor is further configured to sum pulse waveform data signals which amplitudes exceed a predetermined amplitude threshold to obtain the integral signal of the waveform data.

Optionally, the data processor is further configured to recognize peaks with respect to the pulse waveform data signals which amplitudes exceed a predetermined amplitude threshold to determine the number of the peaks and amplitude of each peak, so as to obtain the count signal of the waveform data.

Optionally, the apparatus further comprises a amplifier which amplifies electrical signals from the radiation detector and sends the amplified signals to the ADC.

Optionally, the apparatus further comprises a temperature compensator which adjusts a working bias voltage of the radiation detector according to a temperature change of the radiation detector.

Optionally, the data processor comprises a Field Programmable Gate Array (FPGA).

This apparatus can determine the mass thickness of an object according to the number of the single photon signals, and the number of the single photon signals can be determined according to the waveform data by the apparatus. Because when X-rays penetrating through substances having smaller mass thicknesses, a strong integral signal may be caused, and when the X-rays penetrating through substances having larger mass thicknesses, a weak integral signal and a strong count signal may be caused, so that the apparatus can determine to perform the imaging process by using the integral signal of the waveform data, the count signal of the waveform data or the combination thereof according to the mass thickness of the object. Then the quality of radiation detection imaging for objects having different mass thicknesses can be improved, and the apparatus's detection and recognition capability can be increased.

According to another aspect of this disclosure, a radiation detection method is provided, comprising: generating an electrical signal by interacting with X-rays; transmitting the electrical signal to a waveform data; determining the number of single photon signals according to the waveform data; and determining whether an integral signal and/or a count signal of the waveform data will be used for imaging according to the number of the single photon signals.

Optionally, whether an integral signal and/or a count signal of the waveform data will be used for imaging is determined according to the number of the single photon signals by: comparing the number of the single photon signals with a predetermined lower threshold and a predetermined upper threshold; using the integral signal of the waveform data as an imaging signal to perform imaging if the number of the single photon signals is less than the predetermined lower threshold; using the count signal of the waveform data as an imaging signal to perform imaging if the number of the single photon signals is greater than the predetermined upper threshold; and using a weighted value of the count signal and the integral signal as an imaging signal to perform imaging if the number of the single photon signals is between the predetermined lower threshold and the predetermined upper threshold.

Optionally, the number of single photon signals is determined by acquiring single photon signal recognition parameters according to the waveform data, wherein the single photon signal recognition parameters including peak amplitude, the number of peaks and/or integral area size.

Optionally, the radiation detection method further comprising: summing pulse waveform data signals which amplitudes exceed a predetermined amplitude threshold to obtain the integral signal of the waveform data.

Optionally, the radiation detection method further comprising: amplifying electrical signals from the radiation detector and sending the amplified signals to the ADC.

Optionally, the radiation detection method further comprising: adjusting a working bias voltage of the radiation detector according to a temperature change of the radiation detector.

With this method, the mass thickness of an object can be determined according to the number of the single photon signals, and the number of the single photon signals can be determined according to the waveform data by the apparatus. The apparatus can determine to perform the imaging process by using the integral signal of the waveform data, the count signal of the waveform data or the combination thereof according to the mass thickness of the object, so that the quality of radiation detection imaging for objects having different mass thicknesses can be improved, and the apparatus's detection and recognition capability can be increased.

According to another aspect of this disclosure, a method for processing radiation detection data is provided, comprising: determining the number of single photon signals according to a waveform data; and determining whether an integral signal and/or a count signal of the waveform data will be used for imaging according to the number of the single photon signals.

Optionally, an integral signal and/or a count signal of the waveform data will be used for imaging is determined according to the number of the single photon signals by: comparing the number of the single photon signals with a predetermined lower threshold and a predetermined upper threshold; using the integral signal of the waveform data as an imaging signal to perform imaging if the number of the single photon signals is less than the predetermined lower threshold; using the count signal of the waveform data as an imaging signal to perform imaging if the number of the single photon signals is greater than the predetermined upper threshold; and using a weighted value of the count signal and the integral signal as an imaging signal to perform imaging if the number of the single photon signals is between the predetermined lower threshold and the predetermined upper threshold.

Optionally, the number of the single photon signals is determined by acquiring single photon signal recognition parameters according to the waveform data, wherein the single photon signal recognition parameters including peak amplitude, the number of peaks and/or integral area size.

With this method, the number of single photon signals can be determined according to the waveform data, and the mass thickness of the object can be determined according to the number of the single photon signals. In turn it can be determined that the imaging process will be performed by using the integral signal of the waveform data, the count signal of the waveform data or a combination thereof according to the number of single photon signals, so that the quality of radiation detection imaging can be improved for objects having different mass thicknesses, and the detection and recognition capability can be increased.

According to still another aspect of this disclosure, a radiation detection apparatus is provided, comprising a memory, and a processor coupled to the memory; the processor is configured to perform a method based on the program stored in the memory according to the method for processing radiation detection data above.

Optionally, the processor is configured to perform a method of: comparing the number of the single photon signals with a predetermined lower threshold and a predetermined upper threshold; using the integral signal of the waveform data as an imaging signal to perform imaging if the number of the single photon signals is less than the predetermined lower threshold; using the count signal of the waveform data as an imaging signal to perform imaging if the number of the single photon signals is greater than the predetermined upper threshold; and using a weighted value of the count signal and the integral signal as an imaging signal to perform imaging if the number of the single photon signals is between the predetermined lower threshold and the predetermined upper threshold.

This radiation detection apparatus can determine the number of the single photon signals according to the waveform data, and determine the mass thickness of the object according to the number of the single photon signals. The data processor in turn determines the imaging process will be performed by using the integral signal of the waveform data, the count signal of the waveform data or a combination thereof according to the number of single photon signals, so that the quality of radiation detection imaging can be improved for objects having different mass thicknesses, and the detection and recognition capability can be increased.

BRIEF DESCRIPTION OF THE DRAWINGS

The accompanying drawings, which are included to provide a further understanding of the disclosure and are incorporated in and constitute a part of this specification, illustrate embodiments of the disclosure, and together with the description serve to explain the principles of the invention, but are not limitation thereof. In the drawings.

DETAILED DESCRIPTION OF THE INVENTION

Below, the technical solution of this disclosure will be further described in detail with reference to the accompanying drawings and embodiments.

Figure 1:
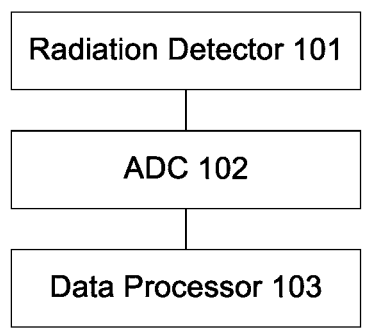
FIG. 1 is a schematic view of an embodiment of the radiation detection apparatus of this disclosure.

FIG. 1 shows a schematic view of an embodiment of the radiation detection apparatus according to this disclosure. A radiation detector 101 converts light signals generated by scintillators interacting with transmitted X-rays into electrical signals during an X-ray transmission detection process. An ADC 102 performs waveform sampling on the electrical signals to obtain waveform data and sends the data to a data processor 103. In an embodiment, the ADC 102 is a high speed ADC. The data processor 103 determines the number of single photon signals according to the waveform data, and determines whether an integral signal of the waveform data, a count signal of the waveform data, or a weighted value thereof will be used to perform an imaging process according to the number of single photon signals. In one embodiment, the data processor 103 can obtain the integral signal and the count signal according to waveform data, and then determine the number of single photon signals according to the waveform data.

Because X-rays penetrating through substances having smaller mass thicknesses may cause a less number of single photon signals, and a strong integral signal; X-rays penetrating through substances having larger mass thicknesses may cause a larger number of single photon signals, a strong count signal, and a weaker signal integral feature, so a stronger signal corresponding to a mass thickness of the object to be detected can be selected for displaying according to the number of the single photon signals.

In one embodiment, the data processor 103 may be an FPGA, or may be formed through connecting a counter, an integrator, a comparator, an adder and a multiplier.

This apparatus can determine the mass thickness of an object to be detected according to the number of the single photon signals, and the number of the single photon signals can be determined according to the waveform data by the apparatus. The apparatus can determine to perform the imaging process by using the integral signal of the waveform data, the count signal of the waveform data or the combination thereof according to the mass thickness of the object. Then the quality of radiation detection imaging for objects having different mass thicknesses can be improved, and the apparatus's detection and recognition capability can be increased.

Figure 2:
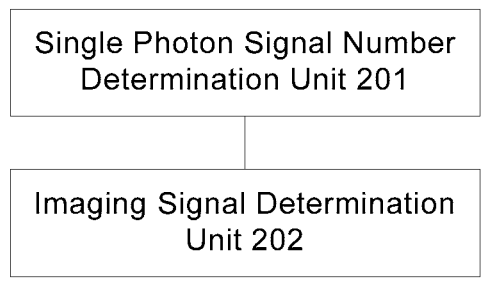
FIG. 2 is a schematic view of an embodiment of the radiation detection data processor of this disclosure.

FIG. 2 shows a schematic view of an embodiment of the radiation detection data processor according to this disclosure. A single photon signal number determination unit 201 can determine the number of the single photon signals according to the waveform data. An imaging signal determination unit 202 can determine whether an integral signal of the waveform data, a count signal of the waveform data or the both is used to perform an imaging process according to the number of the single photon signals. If less single photon signals are detected, an imaging process will be performed mainly depending on the integral signal, otherwise if more single photon signals are detected, the imaging process will be performed mainly depending on the count signal.

This data processor can determine the number of single photon signals according to the waveform data, and determine the mass thickness of the object according to the number of the single photon signals. The data processor in turn determines the imaging process will be performed by using the integral signal of the waveform data, the count signal of the waveform data or a combination thereof according to the number of single photon signals, so that the quality of radiation detection imaging can be improved for objects having different mass thicknesses, and the detection and recognition capability can be increased.

In one embodiment, the imaging signal determination unit 202 can compare the number of the single photon signals with a predetermined lower threshold and a predetermined upper threshold. The predetermined lower threshold and the predetermined upper threshold can be configured and adjusted according to an operator's experience and practical applications.

If the number of single photon signals is less than the predetermined lower threshold, it indicates that the object to be detected has a smaller mass thickness, which may cause a stronger integral signal. Thus, the integral signal of the waveform data can be used as the imaging signal, and the imaging apparatus can perform an imaging process according to the integral signal.

If the number of single photon signals is larger than the predetermined upper threshold, it indicates that the object to be detected has a larger mass thickness, which may cause a stronger count signal. Thus, the count signal of the waveform data can be used as an imaging signal, and the imaging apparatus can perform an imaging process according to the count signal.

If the number of single photon signals is between the predetermined lower threshold and the predetermined upper threshold, a weighted value of the count signal and the integral signal can be used as an imaging signal to perform the imaging process. In one embodiment, the imaging signal Z can be determined according to the following equation:

$$Z = A*X + B*Y$$

wherein, X is the count signal, Y is the integral signal, A is a weight value of the count signal, and B is a weight value of the integral signal. In one embodiment, A and B are constant values that can be configured and adjusted by the operator according to his/her experience and practical applications. A and B can also be values having a certain computing relationship with the number of single photon signals, for example, A may be positively correlated with the number of the single photon signals, and B may be negatively correlated with the number of the single photon signals. The imaging signal determination unit 202 can calculate A, B based on a predetermined strategy according to the number of single photon signals, and in turn obtains an imaging signal Z through calculation.

This data processor can make a quantitative judgment about the number of the single photon signals according to the predetermined lower threshold and the predetermined upper threshold to determine an imaging signal, so that the accuracy of the judgment can be improved, the most appropriate imaging signal can be determined, and the imaging effect can be optimized.

In one embodiment, the single photon signal number determination unit 201 can acquire single photon signal recognition parameters according to the waveform data, the single photon signal recognition parameters includes the peak amplitude, the number of peaks, and the integral area size, etc. Then, the number of single photon signals in the waveform data can be determined according to the single photon signal recognition parameters, such as if the integral area is less than a predetermined area threshold, and/or the peak amplitude is less than a predetermined single photon amplitude threshold, etc, it is considered that a single photon signal occurs.

This data processor can determine the number of the single photon signals according to the waveform data, determine a mass thickness of the object according to the number of the single photon signals, and in turn determine whether an integral signal of the waveform data, a count signal of the waveform data or a combination thereof will be used for imaging.

In one embodiment, the radiation detector may comprise a SiPM radiation detector. In one embodiment, SiPMs are coupled with pure cesium iodide scintillators or lead tungstate scintillators. A plurality of scintillators is arranged in a linear array or in a plane matrix, and is coupled to a plurality of SiPMs arranged at equal intervals to form a detector component. During the detection, X-rays emitted from an X-ray generator and passed through an object to be detected, interacts with the detector (a pure cesium iodide array or lead tungstate crystal array) to generate photons. The photons are converted to electric charge signals after absorption and multiplication by the SiPMs, and an imaging process can be performed through processing the electric charge signals. In one embodiment, more intensive SiPM elements can be arranged in a predetermined sensitive region, such as in the middle portion of the radiation detector, so that detection pixels in the sensitive region can be increased, and the imaging accuracy can be further improved.

In an X-ray detection and imaging system, penetration is an important measure of system performance while optoelectronic devices and scintillators are one of the important factors that may influence the penetration of the system. Selecting the appropriate optoelectronic devices and scintillators plays an important role in improving the penetration measure of the imaging system. Currently, most of the traditional X-ray detectors utilize "scintillator coupled photodiodes", however, traditional photodiodes are unable to discriminate scattered X rays, and thus cannot reduce the impact of scattering on imaging. Also, traditional radiation detectors only have small measuring ranges. Due to their high sensitivity, SiPMs have received more and more attention and have been rapidly applied in the field of single photon counting. X-ray detection and imaging can be performed using the multiplier function of SiPMs though coupling scintillators to SiPMs, so that the signal-to-noise ratio can be improved in images. Because SiPMs have the capability of single photon detection, and there is a significant difference between scattered signals and useful signals in the spectrum, the single photon signals can be discriminated better, which is helpful in selecting the integral signal or the count signal for imaging, and can improve the anti-interference ability of the radiation detection apparatus, improve the clarity of images, and also improve the object discrimination capability of the system. Also, it can reduce the X-ray dose and the needs of the radiation protection requirement under the premise of guaranteeing the imaging effect, improve safety and achieve the energy saving effect.

In one embodiment, if a SiPM radiation detector is adopted, the data processor is further capable of calculating the integral signal and the count signal according to the waveform data. A predetermined amplitude threshold can be set. Waveform data below the predetermined amplitude threshold can be considered as scattered signal data. It is necessary to exclude the influence of the scattered signal data when generating the integral signal and the count signal. The data processor can sum pulse waveform data signals which amplitudes exceed the predetermined amplitude threshold to obtain the integral signal of the waveform data. The data processor recognizes the peaks with respect to the pulse waveform data signals which amplitudes exceed the predetermined amplitude threshold to determine the number of peaks and the amplitude of each peak, and thereby obtain the count signal of the waveform data.

Since X-ray radiations are hardened after penetrating an object having a larger mass thickness, the energy deposition of useful signals is high, generally greater than 1 MeV, while the energy of scattered signals is low, generally below 0.2 MeV., The data processor can discriminate scattered signal data because SiPMs have single photon detection capability, and excludes scattered signal data when calculating the integral signal and/or the count signal, so that the accuracy of imaging can be improved.

In one embodiment, the data processor can firstly determine the number of the single photon signals, determine the type of the imaging signal, and then selectively generate the integral signal or the count signal, thereby the amount of calculation and data storage can be reduced and the efficiency of processing can be improved.

In one embodiment, the data processor can firstly generate the integral signal and the count signal, and then make a selection from the generated signals according to the type of the imaging signal. The data processor may comprise an FPGA unit and a computer processing device. The FPGA unit is used to buffer sampled data, generate the integral signal and the count signal, what's more, sends the integral signal, the count signal and the waveform data to the computer processing device. The computer processing device determines the number of single photon signals according to the waveform data, and further determines to select or compute an image signal from the integral signal and the count signal based on the determined type of the image signal. This device can be easily implemented by making an improvement based on an existing FPGA unit, and using the computer processing device to perform the data processing.

Figure 3:
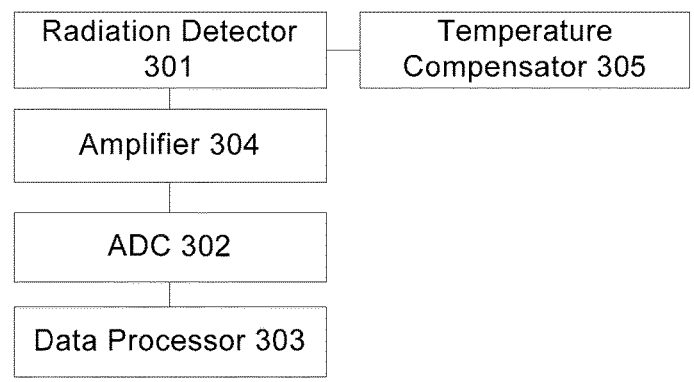
FIG. 3 is a schematic view of another embodiment of the radiation detection apparatus of this disclosure.

FIG. 3 shows a schematic view of another embodiment of the radiation detection apparatus of this disclosure. A amplifier 304 is positioned between a radiation detector 301 and a ADC 302. In one embodiment, the amplifier 304 is a fast amplifier. The amplifier 304 can amplify electrical signals from the radiation detector and output the amplified signals to the ADC, so that it is ensured that the high speed ADC can perform waveform sampling. Thereby, the quality of waveform data is improved, and the accuracy of data processing of the data processor 303 is guaranteed. In one embodiment, the radiation detector 301 may be connected to a temperature compensator 305. In one embodiment, the temperature compensator 305 may be implemented with an FPGA. Because SiPMs are temperature sensitive, also, the gain of a SiPM is correlated with its bias voltage, the temperature compensator 305 can adjust its bias voltage according to the temperature change of the SiPM, so that the gain of the SiPM can be corrected to maintain a constant gain and thereby the accuracy of detection can be improved.

Figure 4:
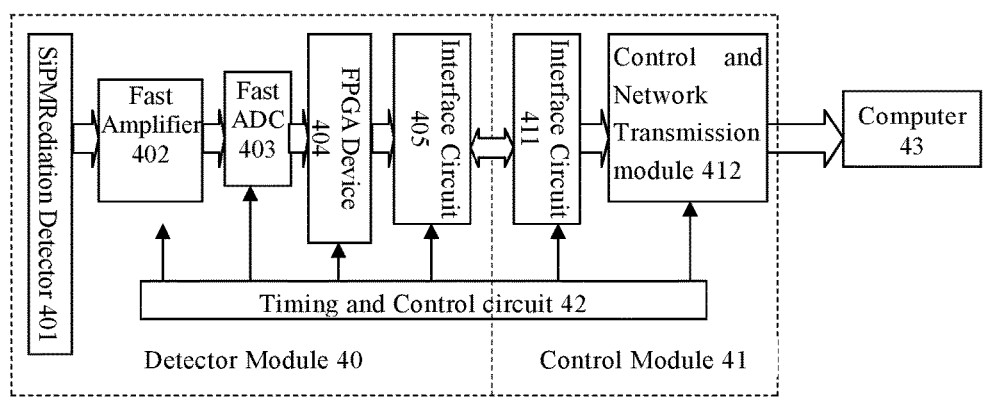
FIG. 4 is a schematic view of the circuit principle according to another embodiment of the radiation detection apparatus of this disclosure.

FIG. 4 is a schematic view of the circuit principle according to another embodiment of the radiation detection apparatus of this disclosure. The radiation detection apparatus can be divided into a detector module 40 and a control module 41. A timing and control circuit 42 performs timing synchronization control of the detector module 40 and the control module 41, and timing and control instructions can be generated by an FPGA device 404. The detector module 40 comprises a SiPM radiation detector 401, a fast amplifier 402, a high speed ADC 403, and an FPGA device 404, which are connected to an interface circuit 411 of the control module 41 via an interface circuit 405. A control and network transmission module 412 of the control module 41 can issue control instructions to the detector module 40 via the timing and control circuit 41, and can send data acquired from the FPGA device 40 to a computer 43 for further data processing and displaying via a network such as a Gigabit Ethernet or a Fiber-Optic network. The FPGA device 404 can only perform waveform data integral and count operations to obtain integral and count signals which are then sent to the computer 43, and the computer 43 determines an imaging signal and performs an imaging process, so that the requirements for hardware circuits can be reduced, the hardware response speed can be increased, and the difficulty of implementation can be reduce. The FPGA device 404 also can directly determine an imaging signal and send it to the computer 43, the computer only has a function of displaying, so that the device can achieve a better integration effect, and is more suitable for using in a portable test environment, and has an increased degree of user friendliness.

Figure 5:
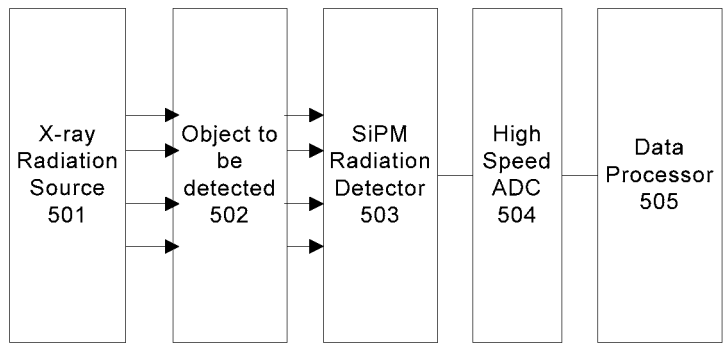
FIG. 5 is a schematic view of an application scenario according to still another embodiment of a radiation detection apparatus of this disclosure.

FIG. 5 is a schematic view of an application scenario according to still another embodiment of the radiation detection apparatus of this disclosure. An object 502 to be detected is placed between an X-ray radiation source 501 and a SiPM radiation detector 503, and it is guaranteed that the SiPM radiation detector 503 can acquire transmitted rays better. X-rays generated by the X-ray radiation source 501 transmit through the object 502 to be detected and reach the SiPM radiation detector 503. The SiPM radiation detector 503 sends a result of detection to a high speed ADC 504 which performs waveform sampling and sends sampled waveform data to a data processor 505 for processing. The data processor 505 determines the number of the single photon signals from the waveform data, and determines whether the integral signal of the waveform data, the count signal of the waveform data, or the weighted value thereof will be used in performing the imaging and displaying process from the number of the single photon signals.

This apparatus can determine the number of single photon signals according to the waveform data, and further determine whether an integral signal, a count signal, or a combination thereof will be used for imaging, so that the quality of radiation detection imaging can be improved for objects having different mass thicknesses.

Figure 6:
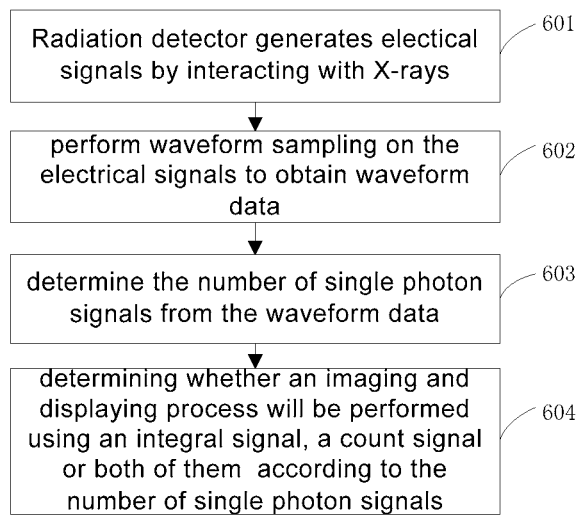
FIG. 6 is a flowchart of an embodiment of a radiation detection method of this disclosure.

FIG. 6 is a flowchart of an embodiment of a radiation detection method of this disclosure.

At step 601, light signals generated by scintillators interacting with transmitted X-rays are converted into electrical signals during an X-ray transmission detection process.

At step 602, waveform sampling is performed on the electrical signals to obtain waveform data.

At step 603, the number of the single photon signals is determined according to the waveform data.

At step 604, it is determined whether an integral signal of the waveform data, a count signal of the waveform data, or a weighted value thereof will be used to perform an imaging process according to the number of single photon signals. Because X-rays penetrating through substances having smaller mass thicknesses may cause a less number of single photon signals, and a strong integral signal; X-rays penetrating through substances having larger mass thicknesses may cause a larger number of single photon signals, a strong count signal, and a weaker signal integral feature, so a stronger signal corresponding to a mass thickness of the substance to be detected can be selected for displaying according to the number of the single photon signals.

With this method, the mass thickness of an object can be determined according to the number of single photon signals, and the number of the single photon signals can be determined according to the waveform data by the apparatus. The apparatus can determine to perform the imaging process by using the integral signal of the waveform data, the count signal of the waveform data or the combination thereof according to the mass thickness of the object, so that the quality of radiation detection imaging for objects having different mass thicknesses can be improved, and the apparatus's detection and recognition capability can be increased.

A flowchart of an embodiment of the radiation detection data processing method is shown in steps 603 and 604 of the embodiment shown in FIG. 6. The number of single photon signals can be determined according to the waveform data, and then it is determined whether an integral signal of the waveform data or a count signal or the both is used to perform an imaging process according to the number of single photon signals. For example, the imaging process will be performed mainly depending on an integral signal if no single photon signal is detected; otherwise the imaging process will be performed mainly depending on a count signal if single photon signals are detected.

With this method, the number of single photon signals can be determined according to the waveform data, and the mass thickness of the object can be determined according to the number of the single photon signals. And in turn it can be determined that the imaging process will be performed by using the integral signal of the waveform data, the count signal of the waveform data or a combination thereof from the number of single photon signals, so that the quality of radiation detection imaging can be improved for objects having different mass thicknesses. The detection and recognition capability can be increased.

Figure 7:
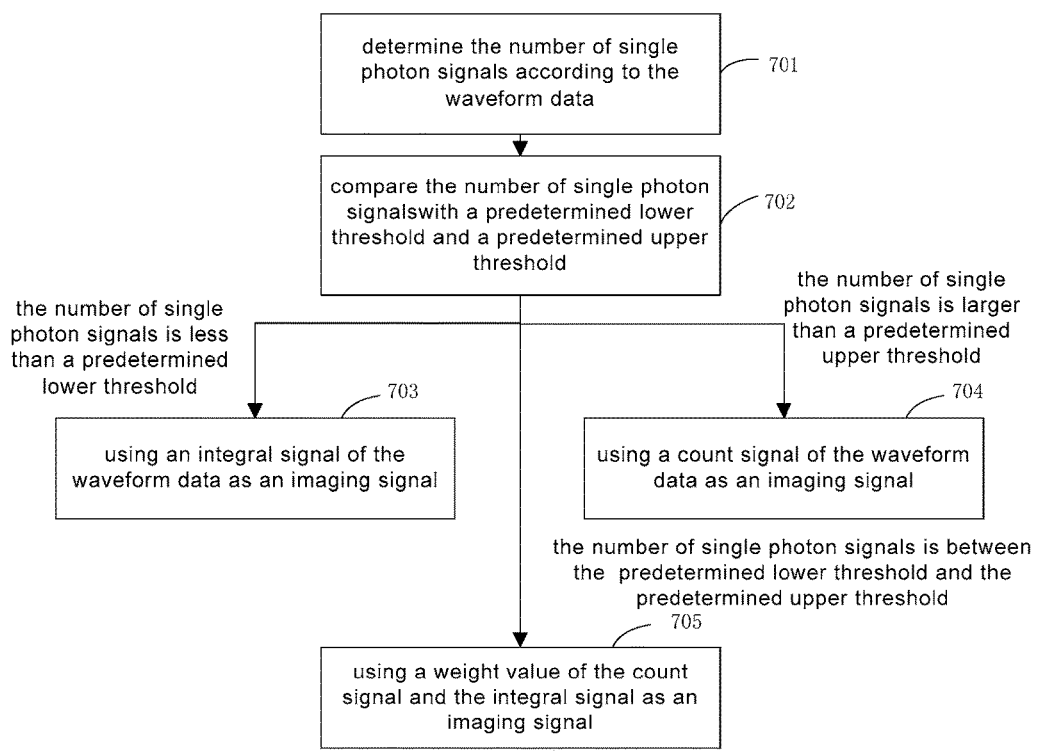
FIG. 7 is a flowchart of an embodiment of the radiation detection data processing method of this disclosure.

FIG. 7 is a flowchart of another embodiment of the radiation detection data processing method of this disclosure.

At step 701, the number of the single photon signals is determined according to the waveform data. In one embodiment, single photon signal recognition parameters can be acquired according to the waveform data, the single photon signal recognition parameters includes the peak amplitude, the number of peaks, and the integral area size, etc. Then, the number of single photon signals in the waveform data can be determined according to the single photon signal recognition parameters, such as if the integral area is less than a predetermined area threshold, and/or the peak amplitude is less than a predetermined single photon amplitude threshold, etc, it is considered that a single photon signal occurs.

At step 702, the number of the single photon signals is compared with a predetermined lower threshold and a predetermined upper threshold. If the number of the single photon signals is less than the predetermined lower threshold, step 703 will be performed. If the number of single photon signals is larger than the predetermined upper threshold, step 704 will be performed. If the number of single photon signals is between the predetermined lower threshold and the predetermined upper threshold, step 705 will be performed.

At step 703, the integral signal of the waveform data is used as an imaging signal, and the imaging apparatus performs an imaging process according to the integral signal.

At step 704, the count signal of the waveform data is used as an imaging signal, and the imaging apparatus performs an imaging process according to the count signal.

At step 705, the weight value of the count signal and the integral signal is used as an imaging signal to perform the imaging process. In an embodiment, the imaging signal is determined according to the following equation:

$$Z = A*X + B*Y$$

wherein, X is the count signal, Y is the integral signal, A is a weight value of the count signal, and B is a weight value of the integral signal. In one embodiment, A and B are constant values that can be configured and adjusted by the operator according to his/her experience and practical applications. A and B can also be values having a certain computing relationship with the number of single photon signals, for example, A may be positively correlated with the number of the single photon signals, and B may be negatively correlated with the number of single photon signals. The imaging signal determination unit 202 can calculate A, B based on a predetermined strategy according to the number of single photon signals, and further obtains an imaging signal Z through calculation.

With this method, a quantitative judgment about the number of the single photon signals can be made according to the predetermined lower threshold and the predetermined upper threshold to determine an imaging signal, so that the accuracy of the judgment can be improved, the most appropriate imaging signal can be determined, and the imaging effect can be optimized.

In one embodiment, the radiation detector may comprise a SiPM radiation detector. In one embodiment, SiPMs are coupled with pure cesium iodide scintillators or lead tungstate scintillators. A plurality of scintillators is arranged in a linear array or in a plane matrix, and is coupled to a plurality of SiPMs arranged at equal intervals to form a detector component. In one embodiment, more intensive SiPM elements can be arranged in a predetermined sensitive region, such as in the middle portion of the radiation detector, so that detection pixels in the sensitive region can be increased, and the imaging accuracy can be further improved.

Nowadays, SiPMs have been rapidly applied in the field of single photon counting due to their high sensitivity. X-ray detection and imaging can be performed using the multiplier function of SiPMs though coupling scintillators to SiPMs, so that the signal-to-noise ratio can be improved in images. Because SiPMs have the capability of single photon detection, and there is a significant difference between scattered signals and useful signals in the spectrum, the single photon signals can be discriminated better, which is helpful in selecting the integral signal or the count signal for imaging, and can improve the anti-interference ability of the radiation detection apparatus, improve the clarity of images, and also improve the object discrimination capability of the system. Also, it can reduce the X-ray dose and the radiation protection requirement under the premise of guaranteeing the imaging effect, improve safety and achieve the energy saving effect.

Figure 8:
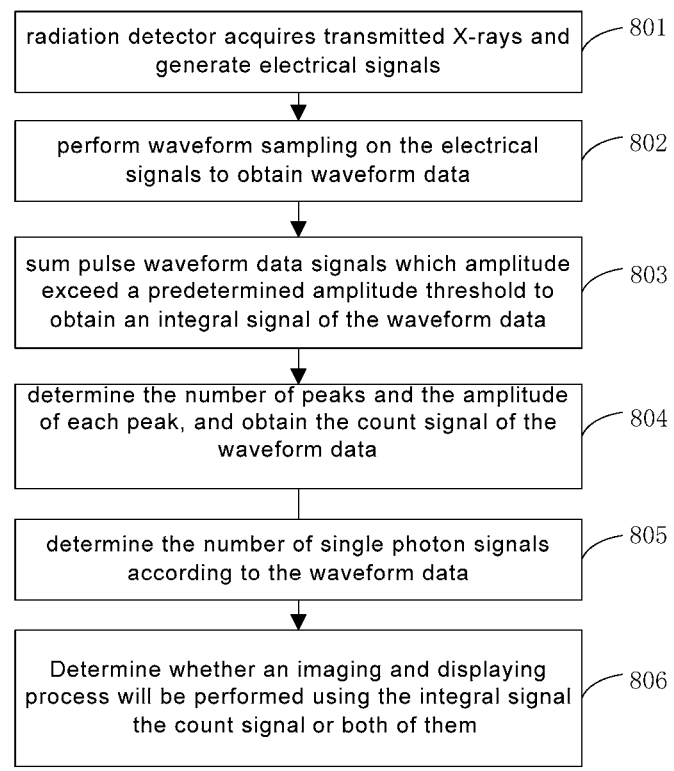
FIG. 8 is a flowchart of another embodiment of the radiation detection method of this disclosure.

FIG. 8 is a flowchart of another embodiment of the radiation detection method of this invention.

At step 801, light signals generated by scintillators interacting with transmitted X-rays are converted into electrical signals during an X-ray transmission detection process.

At step 802, waveform sampling is performed on the electrical signals to obtain waveform data, and the waveform data is sent to a data processor.

At step 803, pulse waveform data signals which amplitudes exceed the predetermined amplitude threshold are summed to obtain the integral signal of the waveform data.

At step 804, peaks with respect to the pulse waveform data signals which amplitude exceed the predetermined amplitude threshold are recognized to determine the number of peaks and the amplitude of each peak, and thereby obtain the count signal of the waveform data.

At step 805, the number of the single photon signals is determined from the waveform data.

At step 806, it is determined whether the integral signal of the waveform data, the count signal of the waveform data, or a weighted value thereof will be used to perform an imaging and displaying from the number of single photon signals.

Since the energy of scattered signals is low, generally below 0.2 MeV, and SiPMs have single photon detection capability, using this method, scattered signal data can be discriminated from the waveform data and excluded from the calculation of the integral signal and/or the count signal, so that the signal-to-noise ratio and the penetration capability of the system can be increased, and the accuracy of imaging can be improved.

In one embodiment, the number of the single photon signals can firstly be determined, after which the type of the imaging signal is determined and then the integral signal or the count signal is selectively generated, thereby the amount of calculation and data storage can be reduced and the efficiency of processing can be improved.

In one embodiment, an integral signal and a count signal can be firstly generated, and then a selection is made from the generated signals according to the type of the imaging signal. This processing method is more generic, and an FPGA unit can be used to generate the integral signal and the count signal. Then, the integral signal, the count signal and the waveform data can be sent to a computer processing device, which determines the number of the single photon signals according to the waveform data, and further selects or calculates an imaging signal from the integral signal and the count signal according to a determined type of the imaging signal. This device can be easily implemented by making an improvement based on an existing FPGA unit, and using the computer processing device to perform the data.

In one embodiment, electrical signals from the radiation detector can be amplified by a fast amplifier and then the amplified signals are sent to a high speed ADC for waveform sampling, so that it is ensured that the high speed ADC can perform waveform sampling. Thereby, the quality of waveform data is improved. The accuracy of data processing and the imaging quality are guaranteed.

In one embodiment, because SiPMs are temperature sensitive, the gain of a SiPM is correlated with its bias voltage, a temperature compensator can be used to adjust the working bias voltage of the SiPM radiation detector according to the temperature change of the SiPM, so that the gain of the SiPM can be corrected to maintain a constant gain. Thereby the accuracy of detection can be improved.

It shall be noted that: the above embodiments are merely illustration of the technical solution of this invention, but are not limitation thereof. Although this invention has been described in detail with preferred embodiments, those ordinary skilled in the art shall understand: embodiments of the present invention may be modified or some technical features thereof may be substituted equivalently, without departing from the spirit of the technical solution of this invention, all of which shall be encompassed in the scope of the technical solution as claimed in this invention.

What is claimed is:

1. A radiation detection apparatus, comprising:
   a radiation detector which generates an electrical signal by interacting with X-rays;
   an Analog-to-Digital Converter (ADC) which is coupled to the radiation detector and converts the electrical signal to a waveform data;
   a data processor which determines the number of single photon signals according to the waveform data from the ADC, and determines whether an integral signal and/or a count signal of the waveform data will be used for imaging according to the number of the single photon signals, comprising: using the integral signal of the waveform data as an imaging signal to perform imaging if the number of the single photon signals is less than a predetermined lower threshold, and using the count signal of the waveform data as an imaging signal to perform imaging if the number of the single photon signals is greater than a predetermined upper threshold; and an imaging apparatus which:
performs imaging according to the integral signal of the waveform data when the number of the single photon signals is less than the
predetermined lower threshold; and
performs imaging according to the count signal of the waveform data when the number of the single photon signals is greater than the
predetermined upper threshold.

2. The apparatus according to claim 1, wherein the data processor is further configured to determine whether an integral signal and/or a count signal of the waveform data will be used for imaging according to the number of the single photon signals by:
comparing the number of the single photon signals with the predetermined lower threshold and the predetermined upper threshold;
using a weighted value of the count signal and the integral signal as an imaging signal to perform imaging if the number of the single photon signals is between the predetermined lower threshold and the predetermined upper threshold.

3. The apparatus according to claim 2, wherein the data processor comprises a Field Programmable Gate Array (FPGA).

4. The apparatus according to claim 1, wherein the data processor is further configured to determine the number of the single photon signals by acquiring single photon signal recognition parameters according to the waveform data, wherein the single photon signal recognition parameters includes peak amplitude, the number of peaks and/or integral area size.

5. The apparatus according to claim 1, wherein,
the data processor is further configured to sum pulse waveform data signals which amplitudes exceed a predetermined amplitude threshold to obtain the integral signal of the waveform data; and/or
the data processor is further configured to recognize peaks with respect to the pulse waveform data signals which amplitudes exceed a predetermined amplitude threshold to determine the number of the peaks and amplitude of each peak, so as to obtain the count signal of the waveform data.

6. The apparatus according to claim 1, further comprising:
an amplifier which amplifies electrical signals from the radiation detector and sends the amplified signals to the ADC;
and/or,
a temperature compensator which adjusts a working bias voltage of the radiation detector according to a temperature change of the radiation detector.

7. A radiation detection method, comprising:
generating an electrical signal by interacting with X-rays;
converting the electrical signal to a waveform data;
determining the number of single photon signals according to the waveform data;
determining whether an integral signal and/or a count signal of the waveform data will be used for imaging according to the number of the single photon signals, comprising: using the integral signal of the waveform data as an imaging signal to perform imaging if the number of the single photon signals is less than a predetermined lower threshold, and using the count signal of the waveform data as an imaging signal to perform imaging if the number of the single photon signals is greater than a predetermined upper threshold;
performing imaging according to the integral signal of the waveform data when the number of the single photon signals is less than the predetermined lower threshold; and
perform imaging according to the count signal of the waveform data when the number of the single photon signals is greater than the predetermined upper threshold.

8. The method according to claim 7, wherein,
it is determined whether an integral signal and/or a count signal of the waveform data will be used for imaging according to the number of the single photon signals by:
comparing the number of the single photon signals with the predetermined lower threshold and the predetermined upper threshold;
using a weighted value of the count signal and the integral signal as an imaging signal to perform imaging if the number of the single photon signals is between the predetermined lower threshold and the predetermined upper threshold.

9. The method according to claim 7, wherein,
the number of single photon signals is determined by acquiring single photon signal recognition parameters according to the waveform data, wherein the single photon signal recognition parameters including peak amplitude, the number of peaks and/or integral area size.

10. The method according to claim 7, further comprising:
summing pulse waveform data signals which amplitudes exceed a predetermined amplitude threshold to obtain the integral signal of the waveform data; and/or
recognizing peaks with respect to the pulse waveform data signals which amplitudes exceed a predetermined amplitude threshold to determine the number of peaks and amplitude of each peak, so as to obtain the count signal of the waveform data.

11. The method according to claim 7, further comprising:
amplifying electrical signals from the radiation detector and sending the amplified signals to the ADC; and/or
adjusting a working bias voltage of the radiation detector according to a temperature change of the radiation detector.

12. A radiation detection data processing method, comprising:
determining the number of single photon signals according to a waveform data;
determining whether an integral signal and/or a count signal of the waveform data will be used for imaging according to the number of the single photon signals, comprising: using the integral signal of the waveform data as an imaging signal to perform imaging if the number of the single photon signals is less than a predetermined lower threshold, and using the count signal of the waveform data as an imaging signal to perform imaging if the number of the single photon signals is greater than a predetermined upper threshold; and performing imaging according to the integral signal of the waveform data when the number of the single photon signals is less than the predetermined lower threshold; and perform imaging according to the count signal of the waveform data when the number of the single photon signals is greater than the predetermined upper threshold.

13. The method according to claim 12, wherein it is determined whether an integral signal and/or a count signal of the waveform data will be used for imaging according to the number of the single photon signals by:

comparing the number of the single photon signals with the predetermined lower threshold and the predetermined upper threshold;

using a weighted value of the count signal and the integral signal as an imaging signal to perform imaging if the number of the single photon signals is between the predetermined lower threshold and the predetermined upper threshold.

14. The method according to claim 12, wherein the number of the single photon signals is determined by acquiring single photon signal recognition parameters according to the waveform data, wherein the single photon signal recognition parameters including peak amplitude, the number of peaks and/or integral area size.

\* \* \* \* \*